United States Patent
Cranfill et al.

(10) Patent No.: US 8,652,578 B2
(45) Date of Patent: *Feb. 18, 2014

(54) METHOD OF FORMING A CURED COATING COMPOSITION ON AN AUTOMOBILE COMPONENT

(75) Inventors: David Cranfill, Brighton, MI (US); Keith E. Gutowski, Clawson, MI (US)

(73) Assignee: BASF SE (DE)

(*) Notice: Subject to any disclaimer, the term of this patent is extended or adjusted under 35 U.S.C. 154(b) by 114 days.

This patent is subject to a terminal disclaimer.

(21) Appl. No.: 13/380,281

(22) PCT Filed: Jun. 24, 2010

(86) PCT No.: PCT/EP2010/059011
§ 371 (c)(1),
(2), (4) Date: Dec. 22, 2011

(87) PCT Pub. No.: WO2010/149747
PCT Pub. Date: Dec. 29, 2010

(65) Prior Publication Data
US 2012/0094027 A1    Apr. 19, 2012

Related U.S. Application Data

(60) Provisional application No. 61/220,912, filed on Jun. 26, 2009.

(51) Int. Cl.
*B05D 3/02* (2006.01)

(52) U.S. Cl.
USPC ........ 427/372.2; 427/337; 427/340; 427/341; 427/385.5; 427/421.1; 427/427.4; 526/196; 526/198

(58) Field of Classification Search
None
See application file for complete search history.

(56) References Cited

U.S. PATENT DOCUMENTS 3,255,168 A * 6/1966 Borsini et al. ............... 526/196
4,389,433 A    6/1983 Pampalone (Continued)

FOREIGN PATENT DOCUMENTS

DE    102004030674 A1    1/2006
EP         0087969 A1    9/1983

(Continued)

OTHER PUBLICATIONS

International Preliminary Report on Patentability dated Jan. 4, 2012.

(Continued)

*Primary Examiner* — Erma Cameron
(74) *Attorney, Agent, or Firm* — Novak Druce Connolly Bove + Quigg LLP

(57) ABSTRACT

A method of forming a cured coating composition on an automobile component is provided. The method utilizes a coating compound including a radical polymerizable compound and an organoborane initiator and includes the step of applying the coating composition to the automobile component. The organoborane initiator is complexed with a bifunctional noncyclic blocking agent that has a carbon backbone and two organoborane complexing moieties. The two moieties are different from each other and are selected from the group of an amine moiety, a thiol moiety, and a phosphine moiety. In addition, the two moieties are separated from each other by two to four carbon atoms to increase the nucleophilicity of the blocking agent towards the organoborane initiator. The organoborane initiator is decomplexed from the blocking agent thereby forming a radical that is used to polymerize the radical polymerizable compound and cure the coating composition on the automobile component.

22 Claims, 3 Drawing Sheets

(56) References Cited

U.S. PATENT DOCUMENTS

| | | | |
|---|---|---|---|
| 5,296,433 A * | 3/1994 | Siedle et al. | 502/117 |
| 6,777,512 B1 * | 8/2004 | Sonnenschein et al. | 526/196 |
| 7,863,583 B2 | 1/2011 | Daiss et al. | |
| 2001/0046643 A1 * | 11/2001 | Ogata et al. | 430/281.1 |
| 2007/0196579 A1 | 8/2007 | Neckers et al. | |
| 2008/0085983 A1 * | 4/2008 | Ahn | 528/5 |
| 2009/0111701 A1 * | 4/2009 | Ahn et al. | 506/7 |
| 2010/0297355 A1 | 11/2010 | Cranfill et al. | |
| 2010/0298490 A1 | 11/2010 | Caiozzo et al. | |
| 2012/0100293 A1 | 4/2012 | Gutowski et al. | |
| 2012/0100378 A1 | 4/2012 | Ohrbom et al. | |
| 2012/0116013 A1 | 5/2012 | Gutowski et al. | |

FOREIGN PATENT DOCUMENTS

| | | |
|---|---|---|
| WO | WO-2005/000980 A2 | 1/2005 |
| WO | WO-2008/085234 A1 | 7/2008 |
| WO | WO-2010/149637 | 12/2010 |
| WO | WO-2010/149746 | 12/2010 |
| WO | WO-2010149733 A1 | 12/2010 |
| WO | WO-2010149747 A1 | 12/2010 |
| WO | WO-2012100293 A1 | 8/2012 |

OTHER PUBLICATIONS

International Search Report for PCT/EP2010/059011 mailed Sep. 24, 2010.
Cyril Ollivier et al., "Organoboranes as a Source of Radicals", Chem. Rev. vol. 101, pp. 3415-3434 (2001).
Vincent Darmency et al., "Tin-Free Radical Reactions Mediated by Organoboron Compounds", Top Curr chem vol. 263, pp. 71-106 (2006).
Mark F. Sonnenschein et al., "Mechanism of Trialkylborane Promoted Adhesion to Low Surface Energy Plastics", Macromolecules, vol. 37, pp. 7974-7978 (2004).
Mark F. Sonnenschein et al., "Physical and Chemical Probes of the Bond Strength between Trialkylboranes and Amines, and Their Utility as Stabilized Free Radical Polymerization Catalysts", Macromolecules, vol. 39, pp. 2507-2513, (2006).
Andrei V. Fedorov et al., "Remote Polymerization of Coatings with the Release of Borane from Its Amine Complex", Journal of Applied Polymer Science, vol. 107, pp. 147-152 (2008).
Andrei V. Fedorov, "New Method to Reduce Oxygen Surface Inhibition by Photorelease of Boranes from Borane/Amine Complexes", Macromolecules, vol. 40, pp. 3554-3560 (2007).
V. A. Bhanu et al., "Role of Oxygen in Polymerization Reactions", Chemical Reviews, vol. 91, No. 2, pp. 99-117 (1991).
Michael Caplow, "Kinetics of Carbamate Formation and Breakdown", J. Am. Chem. Soc., vol. 90:24, pp. 6795-6803 (1968).
P. V. Danckwerts, "The Reaction of $CO_2$ with Ethanolamines", Chemical Engineering Science, vol. 34, pp. 443-446 (1979).
John E. Crooks et al., "Kinetics and mechanism of the Reaction between Carbon Dioxide and Amines in Aqueous Solution", J. Chem. Soc. Perkin Trans. II (1989).
Eleanor D. Bates et al., "$CO_2$ Capture by a Task-Specific Ionic Liquid", J. Am. Chem. Soc. vol. 124, No. 6 (2002).
International Search Report of PCT/EP2010/059005 (Sep. 24, 2010).
International Search Report of PCT/EP2010/059009 (Sep. 24, 2010).
International Search Report of PCT/EP2010/058773 (Sep. 13, 2010).

* cited by examiner

Figure 4

Radical Initiation $$R_3B + O_2 \longrightarrow R_2BOO\bullet + R\bullet$$

Radical Propagation $$R\bullet + O_2 \longrightarrow ROO\bullet$$

$$ROO\bullet + R_3B \longrightarrow (ROO)BR_2 + R\bullet$$

Probable Side Reactions $$(ROO)BR_2 + O_2 \longrightarrow (ROO)_2BR$$

$$(ROO)_2BR + R_3B \longrightarrow 2(RO)BR_2$$

$$(RO)BR_2 + O_2 \longrightarrow (RO)_3B$$

METHOD OF FORMING A CURED COATING COMPOSITION ON AN AUTOMOBILE COMPONENT

CROSS-REFERENCE TO RELATED APPLICATIONS

This application is a national stage application (under 35 U.S.C. §371) of PCT/EP2010/059011, filed Jun. 24, 2010, which claims benefit of U.S. Provisional application 61/220,912, filed Jun. 26, 2009.

FIELD OF THE INVENTION

The present invention generally relates to a method of forming a cured coating composition on an automobile component using an organoborane initiator. More specifically, the organoborane initiator is complexed with a specific bi-functional noncyclic blocking agent.

DESCRIPTION OF THE RELATED ART

Automotive finishing and refinishing is a growing industry in the United States and other countries due to an ever increasing number of vehicles being produced. Typically, original equipment manufacturing (OEM) automotive finish coatings and aftermarket refinish automotive coatings are two-part compositions that require physical mixing of two condensed phases. This mixing typically limits control of curing, increases cure times, and hinders application of the coatings to complex shapes and sequestered surfaces.

As such, an interest in using quick cure technology, such as UV-cure and electron beam technology, has arisen in automotive finish and refinish coatings. These technologies utilize free electrons, whether as radicals formed by UV light or as electrons formed from electron beams, to polymerize and cure the coatings. These technologies minimize the curing times of the coatings as compared to differently cured solvent-based and water-based coatings but require expensive equipment such as UV lamps, vacuums, filaments, etc. Thus, use of these technologies is expensive, time consuming, and labor intensive and can suffer from film shrinking and oxygen surface inhibition.

Alternatively, refinish coatings can be cured using heat and large ovens to initiate cross-linking. Typically, the coatings are applied to automobile parts which are then passed through the ovens to cure the coatings. However, use of the ovens is very energy intensive and expensive and has an adverse impact on the environment. In OEM automobile production facilities, the ovens occupy large footprints and are cumbersome to use.

Other technology has also been developed to improve the speed and efficiency of curing coatings. This technology utilizes boron compounds, e.g. organoborane initiators, to form radicals that polymerize organic monomers and cure the coatings. Organoborane initiators initiate free radical polymerization and promote adhesion of the coatings to low surface energy substrates due to their ability to generate radicals and which polymerize the organic monomers. Without intending to be bound by any particular theory, it is believed that diffusion limited oxidation of the organoborane initiators, and production of the radicals therefrom, is driven by the thermodynamic stability of boron-oxygen bonds in the organoborane initiator and causes the organoborane initiators to be pyrophoric in oxygen. Due to this reactivity, the organoborane initiators are commonly stabilized with blocking agents that render the organoborane initiators less susceptible to oxygen insertion and premature radical generation. The blocking agents dissociate under controlled conditions (e.g. with the application of heat or through exposure to a decomplexing agent) to release the organoborane initiators and initiate free radical formation via reaction with oxygen.

The typical blocking agents known in the art, although effective, lack enough versatility for dissociation (i.e., deblocking) under a variety of different coating conditions, especially when applied in finish and refinish applications. Accordingly, there remains an opportunity to develop an improved organoborane complex to use in a method of forming coatings. There also remains an opportunity to develop an improved method of forming a cured coating composition on an automobile component using the organoborane complex.

SUMMARY OF THE INVENTION AND ADVANTAGES

The instant invention provides a method of forming a cured coating composition on an automobile component using an organoborane initiator. The method includes the step of applying a coating composition to the automobile component. The coating composition includes a radical polymerizable compound and an organoborane initiator. The organoborane initiator is complexed with a bi-functional noncyclic blocking agent. This blocking agent has a carbon backbone and two organoborane complexing moieties that are different from each other. The organoborane complexing moieties are selected from the group of an amine moiety, a thiol moiety, and a phosphine moiety and are separated from each other by two to four carbon atoms. This separation increases the nucleophilicity of the blocking agent towards the organoborane initiator. The method also includes the step of decomplexing the organoborane initiator from the blocking agent thereby forming a radical. The method further includes the step of polymerizing the radical polymerizable compound using the radical to cure the coating composition on the automobile component.

The blocking agent of this invention increases the versatility of the method and allows the method to be used in a variety of conditions. More specifically, the blocking agent of this invention can be amine and thiol functional, amine and phosphine functional, or thiol and phosphine functional, thus allowing the method to be tailored to specific conditions and customized for specific curing properties and times. In addition, the varied functionality of the blocking agent allows the blocking agent to be selectively removed from the organoborane initiator to further tailor the method to specific applications. Even further, the separation of the complexing moieties by two to four carbon atoms promotes and enhances the nucleophilicity of the blocking agent, thereby allowing the blocking agent to more completely interact with the organoborane initiator.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein:

FIG. 4 illustrates theorized reaction schemes of radical formation and propagation utilizing an organoborane initiator and also illustrates probable side reactions that may occur between organoboranes and oxygen.

DETAILED DESCRIPTION OF THE INVENTION

Figure 1:
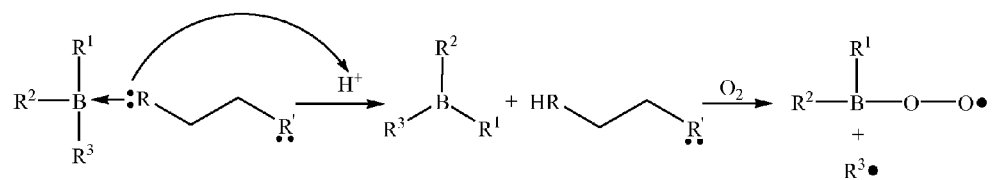
FIG. 1 illustrates a first theoretical reaction mechanism of the decomplexing of an organoborane initiator from a blocking agent using an acid as a decomplexing agent.

The present invention provides a coating composition including a radical polymerizable compound and an organoborane initiator, each described in greater detail below. The present invention also provides a method of forming a cured coating composition on an automobile component and a method of polymerizing the radical polymerizable compound, also described in greater detail below.

The coating composition, hereafter referred to as "composition", may be used in any industry. The composition may be used in a variety of applications including, but not limited to, original equipment manufacturing (OEM) "finish" coatings, aftermarket "refinish" coatings, automotive coatings, protective coatings, films, encapsulants, gels, sealants, release coatings, conformal coatings, and combinations thereof. Most typically, the composition is used as an automotive OEM finish coating or as an automotive refinish coating as a primer, basecoat, clearcoat, and/or sealant.

The composition may be water-borne or solvent-borne and may be used as a one component (1K) or two component (2K) system. The composition is typically applied to a substrate, such as an automobile component, and cured to form a film. In one embodiment, the composition is a 2K system and includes two components that are reactive with each other, e.g. the radical polymerizable compound introduced above, a decomplexing agent described in greater detail below, and the organoborane initiator. In an alternative embodiment, the 2K system includes a cross-linking agent in one component and the radical polymerizable compound and the organoborane initiator in the other component. In this embodiment, the organoborane initiator may be present with the cross-linking agent, the radical polymerizable compound, or with both. In yet another embodiment, the composition is a 1K system and includes the radical polymerizable compound. In still another embodiment, the composition is a 1K system and includes the radical polymerizable compound and the organoborane initiator. In an additional embodiment, the 1K system includes the radical polymerizable compound, the cross-linking agent, and the decomplexing agent. In still further embodiments, the 1K or 2K systems consist essentially of, or consist of, the radical polymerizable compound and the organoborane initiator. The terminology "consisting essentially of" refers to the 1K or 2K system as including only compounds that do not materially affect the basic and novel characteristics of the systems, such as olefins, polyolefins, alkynes, acrylates, unsaturated acrylic ester resins, functional acrylic ester monomers, and the like. In still other embodiments, the 1K and/or 2K systems may include hindered amine light stabilizers (HALS), UVA packages, flow additives, wetting agents, pigments, cross-linkers, catalysts, and the like. Furthermore, the 1K and/or 2K systems may include acrylates and/or methacrylates as the radical polymerizable compound.

As first introduced above, the radical polymerizable compound is present in the coating composition. The radical polymerizable compound typically includes one or more ethylenically unsaturated groups per molecule, i.e., $C\!\!=\!\!C$ groups. It is contemplated that the radical polymerizable compound may include two ethylenically unsaturated groups or three or more ethylenically unsaturated groups. The radical polymerizable compound may also include one or more alkynyl groups, i.e., $C\!\!\equiv\!\!C$ groups The radical polymerizable compound may be selected from the group of monomers, dimers, oligomers, pre-polymers, polymers, co-polymers, block polymers, star polymers, graft polymers, random co-polymers, and combinations thereof, so long as the radical polymerizable compound is still able to be radically polymerized. In one embodiment, the radical polymerizable compound is a monomer. In another embodiment, the radical polymerizable compound is partially polymerized and is an oligomer or polymer, but still retains an ability to be further polymerized. In a further embodiment, the radical polymerizable compound is selected from the group of mono- and poly-unsaturated glycerols or phospholipids, phosphor diesters, peptides, nucleosides, nucleotides, and combinations thereof, having at least one radically polymerizable functional group.

In still a further embodiment, the radical polymerizable compound is selected from the group of acrylates, carbamates, epoxides, and combinations thereof. Suitable non-limiting examples of carbamates and epoxides are those having at least one radically polymerizable functional group and typically one or more functional groups selected from the group of esters, ethers, ketones, aldehydes, carboxylic acids, amides and ureas, acrylics, sulfur groups, phosphorous groups, and combinations thereof. The carbamates may include aliphatic, cycloaliphatic, and aromatic groups and may have linear or branched structures with various functionalities including, but not limited to, branched hydrocarbon functionality, hydroxyl functionality, carboxylate functionality, carbamate functionality, and/or ester functionality. In a further embodiment, the radical polymerizable compound is selected from the group of α,β-unsaturated aliphatic compounds, vinyl esters, substituted styrenes, esters of methacrylic acid, esters of acrylic acid, and combinations thereof. Examples of suitable α,β-unsaturated aliphatic compounds include, but are not limited to, 1-octene, 1-hexene, 1-decene, and combinations thereof. Non-limiting examples of suitable vinyl esters and styrenes include vinyl acetate, styrene, α-methylstyrene, p-methylstyrene, and combinations thereof.

In other embodiments, the radical polymerizable compound is selected from the group of acrylates, halogen substituted acrylates, alkenoates, carbonates, phthalates, acetates, itaconates, and combinations thereof. Suitable examples of acrylates include, but are not limited to, butyl acrylate, t-butyl acrylate, isobornyl acrylate, isodecyl acrylate, 2-ethylhexyl acrylate, lauryl acrylate, cyclohexyl acrylate, octyl acrylate, isocyanate containing acrylates such as isocyanatoacrylate, and combinations thereof. In additional embodiments, the radical polymerizable compound is selected from the group of diacrylates, triacrylates, polyacrylates, urethane acrylates, unsaturated polyesters, and combinations thereof. Suitable examples of di-, tri-, and poly-acrylates include, but are not limited to, hexanediol diacrylate, tripropyleneglycol diacrylate, trimethylolpropane triacrylate, alkoxylated trimethylolpropane triacrylate, pentaerythritol triacrylate, pentaerythritol tetraacrylate, dipentaerythritol hexaacrylate, and combinations thereof. Suitable non-limiting examples of urethane acrylates include Ebercryl 8402 and Ebercryl 8301 commercially available from UCB Chemicals and Actilane 251, commercially available from Akcros Chemicals. Suitable non-limiting examples of unsaturated polyesters include polyesters prepared with maleic anhydride. In an additional embodiment, the radical polymerizable compound is further defined a mixture of an OH-acrylic resin and a dipentaerythritol penta/hexa acrylate. In yet another embodiment, the radical polymerizable compound is selected from the group of unsaturated acrylic and methacrylic ester resins, functional acrylic and methacrylic ester monomers, and combinations thereof.

In still other embodiments, the radical polymerizable compound is selected from the group of butyleneglycol diacrylate, butylene glycol dimethylacrylate, 2-ethylhexylacrylate, 2-ethylhexylmethacrylate, 2-hydroxyethylacrylate, 2-hydroxyethyl methacrylate, methylacrylate, methylmethacrylate, neopentylglycol diacrylate, neopentylglycoldimethacrylate, glycidyl acrylate, glycidyl methacrylate, allyl acrylate, allyl methacrylate, stearyl acrylate, stearyl methacrylate, tetrahydrofurfuryl acrylate, tetrahydrofurfuryl methacrylate, caprolactone acrylate, perfluorobutyl acrylate, perfluorobutyl methacrylate, 1H-, 1H-, 2H-, 2H-heptadecafluorodecyl acrylate, 1H-, 1H-, 2H-, 2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, and combinations thereof. Other examples of suitable acrylates include acrylamides and methacrylamides such as N-isopropyl acrylamide and N,N-dimethylacrylamide. In one embodiment, the radical polymerizable compound is selected from the group of alkylene glycol dialkylacrylate, alkylene glycol diacrylate, and combinations thereof. Most typically, the radical polymerizable compound is an acrylate or methacrylate.

Suitable examples of alkenoates include, but are not limited to, alkyl-N-alkenoates, methyl-3-butenoate, and combinations thereof. Suitable examples of carbonates include, but are not limited to, alkyl carbonates, allyl alkyl carbonates such as allyl methyl carbonate, diallyl pyrocarbonate, diallyl carbonate, and combinations thereof. Suitable itaconates for use in the present invention include, but are not limited to, alkyl itaconates such as dimethyl itaconate. Non-limiting examples of suitable acetates include alkyl acetates, allyl acetates, allyl acetoacetates, and combinations thereof. Non-limiting of examples of phthalates include, but are not limited to, allyl phthalates, diallyl phthalates, and combinations thereof.

The radical polymerizable compound may also include styrene and substituted styrenes, particularly when used in conjunction with acrylic monomers. The radical polymerizable compound may alternatively include acrylate tipped polyurethane prepolymers prepared by reacting isocyanate reactive acrylate monomers, oligomers or polymers, such as hydroxy acrylates, with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. Non-limiting examples include, but are not limited to, 4,4'4"-tris[N-(3(2-acryloyloxyethyloxy)phenyl)-N-phenylamino]triphenylamine, and 4,4'4"-tris[N-(3(benzoyloxyphenyl)-N-phenylamino]triphenylamine.

It is also contemplated that the radical polymerizable compound may include compounds including acryloxyalkyl groups such as an acryloxypropyl group, methacryloxyalkyl groups such as a methacryloxypropyl group, and/or unsaturated organic groups including, but not limited to, alkenyl groups having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic groups may include radical polymerizable groups in oligomeric and/or polymeric polyethers including an allyloxypoly(oxyalkylene) group, halogen substituted analogs thereof, and combinations thereof. In another embodiment, the radical polymerizable compound includes a compound formed by copolymerizing organic compounds having polymeric backbones with the radical polymerizable compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. Of course, it is to be understood that the radical polymerizable compound is not limited to the aforementioned compounds and may include any others known in the art.

In addition to the radical polymerizable compound, the composition may also include the second, a third, or more than three radical polymerizable compounds. The second, third, and any additional radical polymerizable compounds may be the same or different from the radical polymerizable compound described above. In various embodiments, the radical polymerizable compound is typically present in the composition in an amount of from 20 to 99, alternatively in an amount of from 50 to 99, alternatively in an amount of from 60 to 99 and, alternatively in an amount of from 80 to 99, parts by weight per 100 parts by weight of the composition. In another embodiment, the radical polymerizable compound is present in an amount of from 50 to 80 parts by weight per 100 parts by weight of the composition. In this embodiment, 20 parts by weight of the composition typically includes a solvent. In other embodiments, the radical polymerizable compound is typically present in the composition in an amount of from 1 to 90, alternatively in an amount of from 1 to 60, and alternatively in an amount of from 1 to 40, parts by weight per 100 parts by weight of the composition. In still other embodiments, the composition typically includes the second, third, and/or additional radical polymerizable compounds with a total amount of radical polymerizable compounds present in the amounts described above.

Referring back to organoborane initiator first introduced above, the organoborane initiator may be any known in the art. The organoborane initiator typically includes tri-functional boranes which have the general structure:

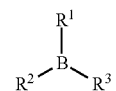

wherein each of $R^1$-$R^3$ may independently have 1 to 20 carbon atoms and wherein each of $R^1$-$R^3$ independently include one of a hydrogen atom, a cycloalkyl group, a linear or branched alkyl group having from 1 to 12 carbon atoms in a backbone, an aliphatic group, and aromatic group, an alkylaryl group, an alkylene group capable of functioning as a covalent bridge to the boron, and halogen substituted homologues thereof, such that at least one of $R^1$, $R^2$, and $R^3$ includes one or more carbon atoms, and is covalently bonded to boron. Up to two of $R^1$-$R^3$ may also independently be an alkoxy group such as a methoxy or ethoxy group such that at least one of $R^1$-$R^3$ provides a boron-carbon covalent bond. The aliphatic and/or aromatic hydrocarbon groups may be linear, branched, and/or cyclic. The organoborane initiator may be further defined as, but is not limited to, tri-methylborane, tri-ethylborane, tri-n-butylborane, tri-n-octylborane, tri-sec-butylborane, tri-dodecylborane, phenyldiethylborane, and combinations thereof. Other suitable examples include 9-BBN in a 0.5M solution as monomer 9-borabicyclo[3.3.1]nonane in hexanes, 9-BBN in a 0.5M solution as monomer 9-borabicyclo[3.3.1]nonane in tetrahydrofuran, 9-BBN in a 0.5M solution as monomer 9-borabicyclo[3.3.1]nonane in toluene, dibutylboron triflate (DBBT) in a 0.5M solution in n-heptane, dibutylboron triflate (DBBT) in a 0.5M solution in methylene chloride, dibutylboron triflate (DBBT) in a 0.5M solution in toluene, dicyclohexylboron triflate (DCBT) in a 0.5M solution in hexanes, dicyclohexylchloroborane (DCBCL) in a 1M solution in hexanes, methoxydiethylborane (MDEB) as a neat liquid, a 50 wt % solution of methoxydiethylborane (MDEB) in tetrahydrofuran, triethylborane (TEB) as a neat liquid, triethylborane (TEB) as a neat liquid in tetrahydrofuran, triethylborane (TEB) in a 1M solution in hexanes, tri-n-butylborane (TNBB) as a neat liquid, tri-sec-butylborane (TSBB) as a neat liquid. Typically, the organoborane is further defined as tri-n-butylborane. For descriptive purposes only, the structure of tri-n-butylborane is set forth below:

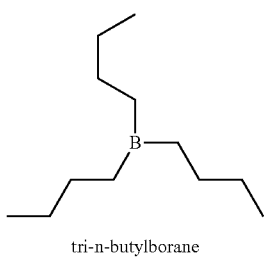

tri-n-butylborane

The organoborane initiator is complexed with a blocking agent to form an organoborane complex. The blocking agent renders the organoborane complex stable at ambient conditions and in a variety of solutions of radical polymerizable compounds. The organoborane complex is capable of initiating polymerization or cross-linking of the radical polymerizable compound after dissociation of the organoborane initiator from the blocking agent.

The organoborane complex typically has a binding energy of from 5 to 25, more typically of from 10 to 20, and most typically of from 10-15, kcal/mol. As is well known in the art, the binding energy of the organoborane complex refers to a net amount of energy required to decompose the organoborane complex into its components, i.e., the organoborane initiator and the blocking agent. Of course, the instant invention is not limited to the aforementioned binding energies.

Without intending to be limited by any particular theory, it is believed that tri-substituted boranes, in the presence of triplet oxygen, can undergo bi-molecular homolytic cleavage at a boron-carbon bond to yield corresponding peroxyl, alkoxyl, alkyl, ketone triplet, and/or thiyl (also known as sulfenyl) radicals. These radicals may propagate by reacting with the organoborane initiator that is dissociated from the blocking agent until termination at a trialkyl borate. Theorized reaction schemes of radical formation and propagation, in addition to probable side reactions that occur, are set forth in FIG. 4. Without intending to be bound by any particular theory, it is believed that alkyl radicals (R•) typically initiate polymerization of the radical polymerizable compound.

The blocking agent is further defined as a bi-functional noncyclic blocking agent. The blocking agent may be linear or branched but cannot be cyclic. In addition, the blocking agent is bi-functional and includes exactly two functional groups that are organoborane complexing moieties. The two organoborane complexing moieties are different from each and are selected from the group of an amine moiety (—$NR_2$), a thiol moiety (—SR), and a phosphine moiety (—$PR_2$) wherein each R is independently a hydrogen atom or an alkyl group. Typically, the amine moiety is a primary amine, but may alternatively be a secondary amine. The organoborane complexing moieties are also separated from each other by two to four carbon atoms. In one embodiment, the organoborane complexing moieties are separated from each other by exactly two carbon atoms such that one of the complexing moieties is alpha to the other. In another embodiment, the organoborane complexing moieties are separated from each other by exactly three carbon atoms. In still another embodiment, the organoborane complexing moieties are separated from each other by exactly four carbon atoms. This separation increases the nucleophilicity of the blocking agent towards the organoborane initiator thereby allowing the blocking agent to more completely interact with the organoborane initiator. Nucleophilicity can also be improved with more than two carbon atoms separating the organoborane complexing moieties.

In one embodiment, the bi-functional noncyclic blocking agent is aliphatic and has a single amine moiety and a single thiol moiety. In another embodiment, the blocking agent is aliphatic and has a single amine moiety and a single phosphine moiety. In still another embodiment, the blocking agent is aliphatic and has a single thiol moiety and a single phosphine moiety. In other embodiments, the blocking agent is free of carbon-carbon unsaturation. Examples of suitable blocking agents include, but are not limited to, 2-aminoethanethiol, 2-phosphinoethanamine, 2-phosphinoethanethiol, 3-aminopropane-1-thiol, 3-phosphinopropan-1-amine, 3-phosphinopropane-1-thiol, 4-aminobutane-1-thiol, 4-phosphinobutan-1-amine, 4-phosphinobutane-1-thiol, alkyl mono-substituted variants on P and N, and combinations thereof. For descriptive purposes only, chemical structures of 2-aminoethanethiol, 2-phosphinoethanamine, 2-phosphinoethanethiol, 3-aminopropane-1-thiol, 3-phosphinopropan-1-amine, 3-phosphinopropane-1-thiol, 4-aminobutane-1-thiol, 4-phosphinobutan-1-amine, and 4-phosphinobutane-1-thiol are set forth below.

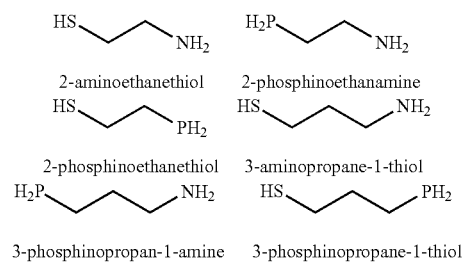

2-aminoethanethiol    2-phosphinoethanamine 2-phosphinoethanethiol    3-aminopropane-1-thiol 3-phosphinopropan-1-amine    3-phosphinopropane-1-thiol -continued

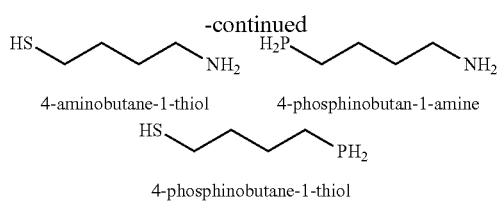

4-aminobutane-1-thiol    4-phosphinobutan-1-amine 4-phosphinobutane-1-thiol

Typically, the bi-functional noncyclic blocking agent is selected from the group of 2-aminoethanethiol, 2-phosphinoethanamine, 2-phosphinoethanethiol, and combinations thereof. It is also contemplated that the bi-functional noncyclic blocking agent may form one or more of the following structures or similar variants thereof:

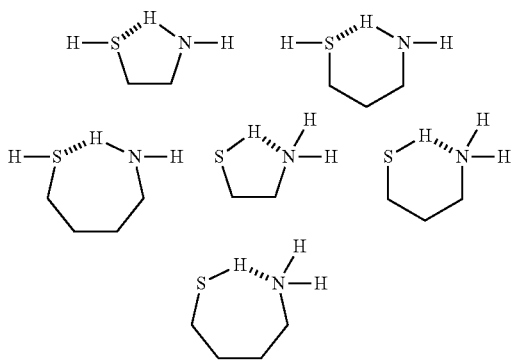

As illustrated above, one hydrogen atom covalently bonded to the nitrogen atom may hydrogen bond to the sulfur atom, thereby "activating" the sulfur atom to promote complexing with the organoborane. Alternatively, the hydrogen atom covalently bonded to the sulfur atom maybe hydrogen bond to the nitrogen atom, thereby "activating" the nitrogen atom to promote complexing with the organoborane.

In one embodiment, the blocking agent is 2-aminoethanethiol and the organoborane is complexed with the amine moiety of the 2-aminoethanethiol. In another embodiment, the blocking agent is also 2-aminoethanethiol but the organoborane is complexed with the thiol moiety of the 2-aminoethanethiol. For descriptive purposes only, a chemical structure of 2-aminoethanethiol is shown below. In addition, typical chemical structures of organoboranes complexed with 2-aminoethanethiol are also shown below.

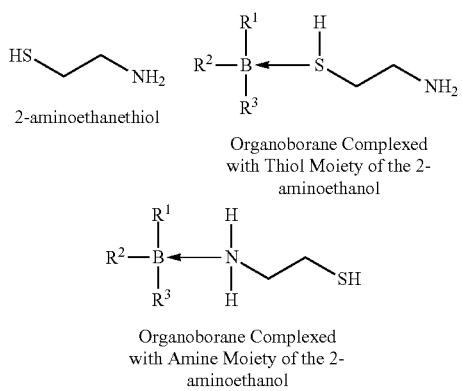

Without intending to be bound by any particular theory, it is believed that binding of the blocking agent may be affected and/or controlled by use of solvents. It is believed that if the blocking agent includes an amine moiety and either a thiol or phosphine moiety, use of non-polar solvents promotes hydrogen bonding of one hydrogen atom covalently bonded to the nitrogen with the sulfur atom or phosphorous atom, as described above, thereby "activating" the sulfur atom or phosphorous atom to promote complexing with the organoborane. Conversely, use of polar solvents in this embodiment is thought to disrupt hydrogen bonding between the nitrogen atom of the amine moiety and a hydrogen atom bonded to either the sulfur atom or the phosphorous atom thus promoting complexing of the nitrogen atom with the organoborane. It is also believed that if the blocking agent includes a thiol moiety and a phosphine moiety, then the use of non-polar solvents activates the phosphorous atom preferentially over the sulfur atom to promote complexing with the organoborane. Alternatively, use of polar solvents in this embodiment is thought to activate the sulfur atom preferentially over the phosphorous atom to promote complexing with the organoborane.

The organoborane complex may be physically and/or chemically attached (bound) to a solid particle such as a phase support to control working times, as well as to stabilize liquid phase organoborane complexes against separating during storage. Attachment can be accomplished by a number of known substrate treatments either in-situ or a priori. Some substrate treatment methods include pre-treating solid particles such as ground or precipitated silica, calcium carbonate, carbon black, carbon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a reactive compound. The pretreatment may be followed by complexation with the organoborane complex, or by direct treatment of the solid particles. If the solid particles include functional groups, additives such as substrate treating agents or impurities that are inherently reactive may require appropriate pre-cautions to avoid premature decomplexation of the organoborane complex being attached. Solid particles including reactive substances can be purified or neutralized before attachment of the organoborane complex. Alternatively, the attachment of the organoborane complex may be performed in an oxygen free environment.

The organoborane complex may be used in any amount to form the composition. Typically, the organoborane complex is used in an amount equivalent to of from 0.01 to 95, more typically of from 0.1 to 80, even more typically of from 0.1 to 30, still more typically of from 1 to 20, even more typically of from 1 to 15, and most typically of from 2 to 5 parts by weight per 100 parts by weight of the composition. The amounts of the organoborane complex depend upon a molecular weight and functionality of the organoborane complex and the presence of other components in the composition such as fillers.

The organoborane initiator of this invention can be synthesized by well known hydroboration techniques. One route of synthesis includes reaction of diethylborane in THF with terminally alkenic compounds. It is known that such reactions generally can produce a mixture of products derived from the addition of boron to either the α-penultimate position or the β-terminal position of the carbon of the double bond. It is to be understood that a β-product, or a mixture of α- and β-products, may also be included in the organoborane initiator.

In various embodiments, the organoborane complex is used for radical polymerization and chain transfers. In various embodiments, the organoborane complex is used to polymerize the radical polymerizable compound to form dimers, oligomers, pre-polymers, polymers, co-polymers, block polymers, star polymers, graft polymers, random co-polymers, and/or combinations thereof that may or may not remain able to be further radically polymerized.

In one embodiment, the organoborane complex is used to polymerize a substituted melamine and an acrylate. An example of such a polymerization is set forth below:

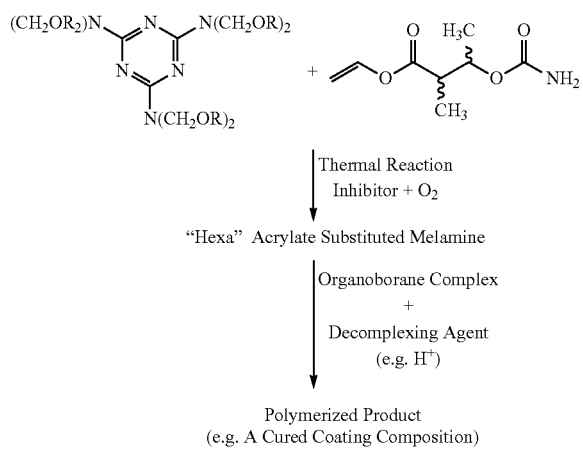

In an alternative embodiment, the organoborane complex is used to polymerize an addition product from the reaction between hydroxy acrylate monomers such as hydroxy ethyl acrylate (HEA) and/or hydroxypropyl acrylate (HPA) and a multi-functional isocyanurate, such as an IPDI trimer, HDI trimer, etc. In a further embodiment, the organoborane complex is used to polymerize an isocyanurate acrylate monomer and a multi-hydroxy or amino functional monomer such as tri-methylolpropane, pentaerythritol, di-ethylene-tri-amine, and the like. In still a further embodiment, the organoborane complex is used to polymerize glycidyl methacrylate. It is also contemplated that acrylate monomers may first be reacted with a substituted melamine, an isocyanurate, or a similar multi-functional moiety to produce a multi-acrylate intermediate which then may be cured into a cross-linked coating composition without UV or other radiation or added heat.

In one embodiment, and only if an amine of the bi-functional noncyclic blocking agent is bound to the organoborane, the composition may include an optional amine. This optional amine is different from any amine of the organoborane complex in that the optional amine is not part of the organoborane complex. However, the optional amine may be chemically identical to any amine that is part of the organoborane complex. Alternatively, the optional amine may be different from any amine that is part of the organoborane complex. Typically, the optional amine is added when a decomplexing agent is used and includes carbon dioxide, as is described in greater detail below. The optional amine is typically a primary amine but may be a secondary amine, or a combination of primary and secondary amines. In one embodiment, the optional amine is ammonia. In another embodiment, the optional amine is selected from the group of ammonia, methylamine, ethanolamine or 2-aminoethanol, propylamine, 2-propylamine, trisamine, dimethylamine, methylethanolamine or 2-(methylamino)ethanol, hexylamine, heptylamine, benzylamine, methoxypropylamine, cysteamine, aziridine, azetidine, pyrrolidone, piperidine, dimethylethanolamine (DMEA) or 2-(dimethylamino)ethanol, and combinations thereof. The optional amine may be included in the composition in a stoichiometric ratio of about 1:1 with the organoborane complex. In other embodiments, the optional amine is included in various stoichiometric ratios to the decomplexing agent, e.g. 1:2, 1:3, 1:4, 1:5, etc. In still other embodiments, a sub-stoichiometric ratio of optional and/or free amine to the organoborane complex can be utilized. In these embodiments, it is surprising and not apparent to the inventors that the composition including sub-stoichiometric ratios of optional and/or free amine to the organoborane complex exhibits enhanced curing properties while showing reduced pyrophoricity. In one embodiment, the sub-stoichiometric ratio of optional and/or free amine to the organoborane-complex is from 0.5:1 to 1:1. In another embodiment, the sub-stoichiometric ratio of optional and/or free amine to the organoborane complex is from 0.6-0.85:1. In still another embodiment, the sub-stoichiometric ratio of optional and/or free amine to the organoborane complex is from 0.7 to 0.8:1. In a further embodiment, the sub-stoichiometric ratio of optional and/or free amine to the organoborane complex is less than about 1:1.

In addition to the aforementioned compounds, the composition may also include one or more additives. The one or more additives may be selected from the group consisting of leveling agents, solvents, surfactants, fillers, stabilizers, solvents, plasticizers, defoaming agents, wetting additives, catalysts, rheology controlling agents, pigments, photosynergists, adhesion promoters, pigment dispersants, flow aids, acid functional polymers, additive polymers, catalysts, and combinations thereof. Non-limiting examples of suitable surfactants include Surfynol® Surfactants commercially available from Air Products and Chemicals, Inc. of Allentown, Pa. Suitable non-limiting examples of plasticizers include Coroc® Acrylic Plasticizer Resins commercially available from Cook Composites and Polymers of St. Louis, Mo.

The one or more additives may also include a catalyst to enhance curing. Such catalysts, which are well-known in the art, include, but are not limited to, p-toluenesulfonic acid, dinonylnaphthalene disulfonic acid, dodecylbenzenesulfonic acid, phenyl acid phosphate, monobutyl maleate, butyl phosphate, hydroxy phosphate ester, and combinations thereof. Other catalysts that may be useful in the composition include, but are not limited to, Lewis acids, transition metal salts such as zinc salts and tin salts, and combinations thereof. The catalyst may be blocked, unblocked, or partially blocked. The catalyst may be blocked or partially blocked with an amine or other suitable blocking agent such as an oxirane modifying material. If included, the catalyst is preferably included in an amount of 0.1 to 1.2, more preferably of 0.1 to 0.9, and most preferably of 0.2 to 0.7, parts by weight per 100 parts by weight of the composition.

If the composition includes a solvent as the one or more additives, the solvent may be any known in the art, including water, and may be HAPs free. In one embodiment, the solvent includes a polar organic solvent. In another embodiment, the solvent includes a polar aliphatic solvent. In an additional embodiment, the solvent includes a polar aromatic solvent. In yet another embodiment, the solvent is selected from the group of a ketone, an ester, an acetate, an aprotic amide, an aprotic sulfoxide, an aprotic amine, and combinations thereof. Non-limiting examples of useful solvents include methyl ethyl ketone, methyl propyl ketone, methyl isobutyl ketone, m-amyl acetate, ethylene glycol butyl ether-acetate, propylene glycol monomethyl ether acetate, xylene, N-methylpyrrolidone, 2-ethylhexanol, n-butanol, dipropylene glycol methyl ether, SC 150 solvent commercially available from Exxon Mobil of Irving, Tex., naptha, heavy benzene, ethyl ethoxypropionate, butylglycol acetate, butylglycol, blends of aromatic hydrocarbons such as Aromatic 100, butyl alcohol, ethyl acetate, butyl acetate, butyl alcohol, propylene glycol monomethyl ether acetate, dipropylene glycol propyl ether, mineral spirits, 2-butoxy ethanol, dipropylene glycol monomethyl ether, dibutyl ether, 2-ethylhexanol, and combinations thereof. If included, the solvent is typically included in an amount of up to 60, more typically in an amount of from 5 to 50, and most typically in an amount of from 10 to 40, parts by weight per 100 parts by weight of the composition.

Further, the one or more additives may include a pigment. When, for example, the composition is used as a basecoat, the pigment may include organic and/or inorganic compounds, colored materials, fillers, metallic and/or inorganic flake materials such as mica or aluminum flake, and combinations thereof. Non-limiting examples of suitable pigments include a carbon black pigment, titanium dioxide and other inorganic colored pigments, such as iron oxide, chrome yellow, moly orange, titanium yellow, nickel titanate yellow, chrome greens, and the like. If included, the pigment is typically included in an amount of up to 60, more typically in an amount of from 5 to 50, and most typically in an amount of from 10 to 40, parts by weight per 100 parts by weight of the composition.

Still further, the one or more additives may include a leveling agent. The leveling agent may include, but is not limited to, vinyl acrylic copolymers, and the like. If included, the leveling agent is typically included in an amount of up to 20, more typically in an amount of from 1 to 10, and most typically in an amount of from 2 to 5, parts by weight per 100 parts by weight of the composition.

Alternatively, the one or more additives may include a stabilizer. The stabilizer may include hindered amine light stabilizers (HALS). If included, the HALS may include any known in the art. Preferably, if included, the HALS have a molecular weight of less than 300 g/mol and more preferably of less than 260 g/mol. Illustrative examples of commercially available HALS that are suitable for use in the present invention include, but are not limited to, Sanduvor® 3058 commercially available from Sandoz LTD. Corporation of Basel, Switzerland, and Tinuvin® 123, 292, and 384 commercially available from Ciba-Geigy Corporation of Ardsley, N.Y. If included, the stabilizer is typically included in an amount of up to 20, more typically in an amount of from 1 to 10, and most typically in an amount of from 2 to 5, parts by weight per 100 parts by weight of the composition.

Referring now to the method of forming the cured coating composition on the automobile component, the method includes the step of applying the composition to the automobile component. The step of applying may include any application method known in the art. Suitable application methods include, but are not limited to, spray coating, dip coating, roll coating, curtain coating, electrostatic spraying, and combinations thereof. In one embodiment, the composition is applied to the automobile component via electrostatic spraying for extrusion coating. In one embodiment of the method, when forming the composition, the radical polymerizable compound and the organoborane initiator are introduced simultaneously to form the composition. In another embodiment of the method, the radical polymerizable compound and the organoborane initiator are introduced sequentially to form the composition.

Figure 2:
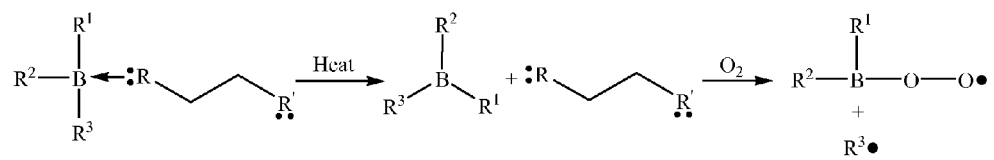
FIG. 2 illustrates a second theoretical reaction mechanism of the decomplexing of the organoborane initiator from the blocking agent using heat.
Figure 3:
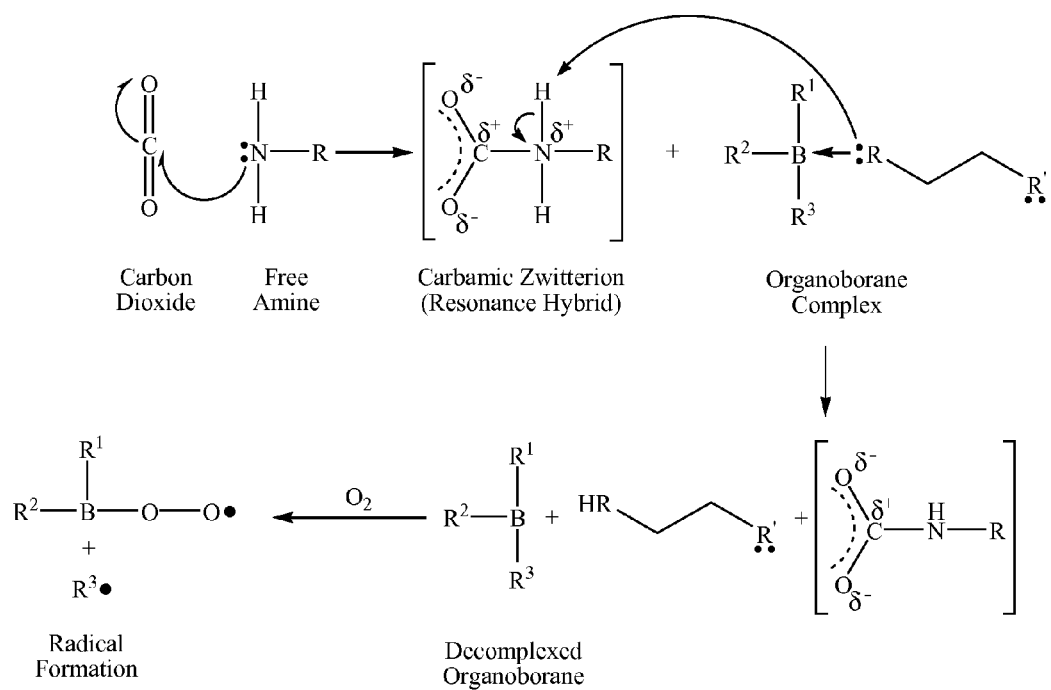
FIG. 3 illustrates a third theoretical reaction mechanism of the decomplexing of the organoborane initiator from the blocking agent using carbon dioxide as a decomplexing agent interacting with a free amine.

The method also includes the step of decomplexing the organoborane initiator from the blocking agent thereby forming a radical. In one embodiment, the step of decomplexing includes applying an energy to the organoborane complex that exceeds its binding energy, as first described above. In other embodiments, the step of decomplexing occurs when a more kinetically or thermodynamically stable product is formed from the decomplexing. The step of decomplexing may be completed using any mechanism known in the art including, but not limited to, use of decomplexing agents, UV light, and/or heat. In one embodiment, the step of decomplexing the organoborane initiator from the blocking agent is further defined as introducing the decomplexing agent to the composition wherein the decomplexing agent is reactive with at least one of the amine moiety, the thiol moiety, and the phosphine moiety. Upon reaction of the decomplexing agent, the organoborane initiator dissociates from (i.e., breaks apart from) the blocking agent. Theoretical reaction mechanisms of the decomplexing of the organoborane initiator from the blocking agent are set forth in FIGS. 1-3 but are not meant to limit the invention in any way. In one embodiment, the step of applying the composition to the automobile component and the step of introducing the decomplexing agent to the composition occur simultaneously. In another embodiment, these steps occur sequentially. In a further embodiment, the steps of applying the composition to the automobile component and introducing the decomplexing agent to the composition are each further defined as spraying the composition and the decomplexing agent from one or more spray guns, e.g. impingement mixing spray guns.

The decomplexing agent may be any known in the art and may be delivered as a gas, liquid, or solid. In one embodiment, the organoborane complex interacts with the decomplexing agent to initiate polymerization or cross-linking of the composition. Typically this occurs when the decomplexing agent is mixed with the organoborane complex and exposed to an oxygenated environment at temperatures below a dissociation temperature of the organoborane complex, including room temperature and below. Without intending to be limited by any particular theory, it is believed that the decomplexing agent sequesters the blocking agent and allows the organoborane initiator to act as a free radical initiator in the presence of $O_2$ and initiate polymerization of the radical polymerizable compound.

In one embodiment, the decomplexing agent includes free radical polymerizable groups or other functional groups such as a hydrolyzable group, and can be monomeric, dimeric, oligomeric or polymeric. Examples of decomplexing agents that include free radical polymerizable groups are acrylic acid, methacrylic acid, 2-carboxyethyl acrylate, 2-carboxyethyl methacrylate, and combinations thereof. Alternatively, the decomplexing agent may be selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof. In one embodiment, the decomplexing agent is selected from the group of acids such as acetic acid, acrylic acid, methacrylic acid, and/or any of the strong acids known in the art, acid halides such as acid chlorides, inorganic acids such as HCl, sulfuric acid, alkyl or aryl sulfonic acid, transition metal cations, strong alkylating agents such as methyl iodide, and combinations thereof. In one embodiment, the decomplexing agent is acetic acid. Typically, the decomplexing agent includes groups that react with the blocking agent. It is contemplated that these groups may be derived from the organoborane complex and/or any additives present. In one embodiment, the decomplexing agent is selected from the group of carbon dioxide, sulfur dioxide, and combinations thereof. In yet another embodiment, the decomplexing agent is carbon dioxide. If carbon dioxide is used, it may be used in any way described in the provisional patent application entitled System And Method For Curing A Composition having the U.S. Ser. No. 61/220,929 or in the provisional patent application entitled Method Of Dissociating An Organoborane-Amine Complex having the U.S. Ser. No. 61/220,876, each of which is filed on the same day herewith.

In all embodiments, the decomplexing agent may be present in the composition in any amount less than 100% of the composition. However, in various embodiments, the decomplexing agent is typically present in an amount of from 0.1 to 95, more typically of from 0.1 to 90, and most typically of from 1 to 50, parts by weight per 100 parts by weight of the composition. The amount of the decomplexing agent depends greatly upon a molecular weight and functionality of the decomplexing agent and the presence of other components such as fillers. To increase polymerization or curing times, it is advantageous to use an amount of the decomplexing agent that provides at least a stoichiometric equivalent, and preferably an excess, of groups that are reactive with the blocking agent to the actual amount of blocking agent present in the composition.

Without intending to be bound by any particular theory, it is believed that when carbon dioxide is used as the decomplexing agent, the carbon dioxide reacts with free amine groups that are present in the composition or as part of the blocking agent. The terminology "free amine groups" refers to any amine that is both (1) available for further reaction and (2) not coordinately bonded (e.g. through a dative or coordinate covalent bond) to the organoborane initiator. The free amine group may be a primary or secondary amine. Typically, the free amine group is a primary amine. In one embodiment, the free amine groups are found in the organoborane-blocker complex when the amine of the complex is di-, tri- tetra-, or poly-functional.

The method also includes the step of polymerizing the radical polymerizable compound using the radical to cure the coating composition on the automobile component. In one embodiment, the step of polymerizing is further defined as polymerizing at a temperature of from −78° C. to 35° C. In another embodiment, the step of polymerizing is further defined as polymerizing at a temperature of from 15° C. to 35° C. In another embodiment, the step of polymerizing is further defined as polymerizing at a temperature of from 20° C. to 30° C. In yet another embodiment, the step of polymerizing is further defined as polymerizing at about room temperature. Alternatively, the method may include the step of applying heat and/or radiation to the composition and/or radical polymerizable to polymerize the radical polymerizable compound. The step of polymerizing the radical polymerizable compound may be further defined as polymerizing to cure the composition on the automobile component.

The step of polymerizing using the radical can be further defined as polymerizing by free radical polymerization. The mechanism of free radical polymerization is well known in the art and typically includes three stages: initiation, propagation, and termination. The initiation and propagation stages are generally outlined in FIG. 4. Typically, and as described above, a homolytic substitution reaction occurs between triplet oxygen and the organoborane initiator thereby forming the radical which reacts with oxygen and forms a peroxide radical. The peroxide radical typically propagates a developing polymer chain through additional homolytic reactions of the radical polymerizable compound and any second, third, or additional radical polymerizable compounds. Without intending to be bound by any particular theory, it is believed that alkyl radicals (R•) typically initiate polymerization of the radical polymerizable compound. The termination stage may include coupling wherein two radical species react with each other forming a single molecule. Alternatively, chain disproportionation may occur wherein two radicals meet and exchange protons.

In one embodiment, the method also includes the step of limiting an amount of oxygen introduced to the composition because it is believed that a presence of oxygen in the composition may inhibit radical formation and propagation thereby inhibiting curing. Similarly, the method may also include the step of limiting an amount of oxygen introduced to the automobile component (e.g. to a surface of the automobile component) to minimize oxygen surface inhibition. However, some oxygen is required to form radicals. The oxygen may be introduced to the substrate and/or composition in a molar ratio of from 1:1 to 5:1 with the organoborane initiator. In other embodiments, the oxygen is present in the composition and/or at the substrate in an amount of 0.5 to 5 parts by weight per 100 parts by weight of carbon dioxide.

The method may also include the step of introducing the optional amine to the composition. In one embodiment, the method includes the step of introducing the optional amine when the decomplexing agent includes carbon dioxide. However, the inclusion of the optional amine is not limited to this embodiment.

In yet another embodiment, the method further includes the step of electrocoating the automobile component with a first composition. The process of electrocoating and the compositions used to electrocoat automobile components are well known in the art. Thus, the step of electrocoating in this invention may be completed using any techniques known in the art. Similarly, the first composition that is used to electrocoat the substrate may be any known in the art suitable for electrocoating. In a further embodiment, the step of applying the coating composition to the automobile component is further defined as applying the coating composition to the first composition on the automobile component. In this embodiment, the first composition is applied to the substrate via the step of electrocoating described above.

In still other embodiments, the method includes one or more of the steps of drawing down the composition on the automobile component, of heating the automobile component, of applying radiation to the automobile component, of drying the automobile component, and/or of installing the automobile component including the cured composition on an automobile chassis. Alternatively, the step of polymerizing the radical polymerizable compound using the radical may occur in the absence of external heating of the coating composition.

As first introduced above, the instant invention also provides the method of polymerizing the radical polymerizable compound using the organoborane initiator. This method includes the step of introducing the radical polymerizable compound and the organoborane initiator onto the substrate to form a mixture. The substrate may be the automobile component described above. If so, the automobile component may be a door, hood, roof, panel, etc., and the like. The automobile component may include steel and/or extruded materials. In one embodiment, the automotive component is further defined as an automotive body panels that is preferably primed or electrocoated.

In other embodiments, the substrate is further defined as a reactor or a vessel. The reactor and/or vessel may be laboratory or industrial sized. Typically, when the substrate is further defined as the reactor and/or vessel, the radical polymerizable compound is polymerized in the reactor or vessel. Once formed, the polymerized compound can then be further used as selected by one of skill in the art. In one embodiment, the polymerized compound is applied to an automobile component after being formed in the reactor.

Alternatively, the substrate may be coated or uncoated, treated or untreated, and combinations of these. In various embodiments, the substrate is selected from the group of plastic, metals such as steel, iron, and aluminum, and combinations thereof. In one embodiment, the method includes forming the coating composition, and polymerizing the radical polymerizable compound, on the automobile component and not in the vessel or reactor. However, as described above, the method is not limited to such an embodiment.

The method of polymerizing the radical polymerizable compound using the organoborane initiator may include any or all of the aforementioned steps described relative to the automobile component. The radical polymerizable compound and the organoborane initiator may be introduced onto the substrate separately, together, or in various combinations. The step of introducing may include any application method known in the art. Suitable application methods include, but are not limited to, spray coating, dip coating, roll coating, curtain coating, electrostatic spraying, and combinations thereof. In one embodiment, the radical polymerizable compound and the organoborane initiator are applied to the substrate via electrostatic spraying for extrusion coating.

For the purposes of this method, the terminology "mixture" may be used interchangeably with the terminology "composition" described above. Accordingly, the mixture may include any or all of the compounds described above either alone or in combination.

EXAMPLES

Five coating compositions (Compositions 1-5) are formed. Compositions 1-3 and 5 are applied to substrates according to the method of the instant invention, as described below.

Formation and Curing of Composition 1:

Composition 1 is formed by combining 10.08 grams of Laromer UA 9061 as a radical polymerizable compound and 0.47 grams of triethylborane 2-aminoethanethiol (also known as cysteamine (TEB-CA)) as the organoborane complex in a vial. Laromer UA 9061 is an aliphatic urethane acrylate that is commercially available from BASF Corporation. After formation, Composition 1 is applied to a metal panel that includes an electrocoat layer and that includes acetic acid rubbed thereon for use as a decomplexing agent. Composition 1 cures after approximately 3 minutes in the vial. After 5-10 minutes, an observable cure is seen on the panel.

Formation and Curing of Composition 2:

Composition 2 is formed by combining 10.0 grams of Laromer UA 9061 and 0.48 grams of triethylborane 2-aminoethanethiol (TEB-CA) as the organoborane complex in a vial. After formation, Composition 2 is applied to a metal panel that includes an electrocoat layer. The panel coated with Composition 2 is then exposed to carbon dioxide as the decomplexing agent. Composition 2 cures after approximately 2 minutes in the vial. After 30 minutes, an observable cure is seen on the panel.

Formation and Curing of Composition 3:

Composition 3 is formed by combining 10.04 grams of Laromer UA 9061 and 0.99 grams of tri-n-butylborane 2-aminoethanethiol (TnBB-CA) as the organoborane complex in a vial. After formation, Composition 3 is applied to a metal panel that includes an electrocoat layer. The panel coated with Composition 3 is then exposed to carbon dioxide as the decomplexing agent. Composition 3 cures after approximately 3-5 minutes in the vial. After 20 minutes, an observable cure is seen on the panel.

Formation and Curing of Composition 4:

Composition 4 is formed by combining 10.58 grams of Laromer UA 9061 and 0.95 grams of tri-n-butylborane 2-aminoethanethiol (TnBB-CA) as the organoborane complex in a vial. The vial is then allowed to stand for 5-6 minutes using latent heat to decomplex the organoborane complex. Composition 4 cures after approximately 6 minutes in the vial.

Formation and Curing of Composition 5:

Composition 5 is formed by combining 9.94 grams of a resin that includes Laromer UA 9043, Ebecryl 9198, Sartomer® CN9008, a urethane acrylate monomer, and an acrylate ester, and 0.51 grams of tri-n-butylborane 2-aminoethanethiol (TnBB-CA) as the organoborane complex in a vial. After formation, Composition 5 is applied to a metal panel that has an electrocoat layer applied. The panel coated with Composition 5 is then exposed to carbon dioxide as the decomplexing agent. After 45 minutes, an observable cure is seen on the panel.

Accordingly, the data set forth above indicate that the method of the instant invention effectively polymerizes radical polymerizable compounds and allows for observable curing of coating compositions. In addition, the Compositions 1-5 exhibit an observable cure in a variety of conditions.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of polymerizing a radical polymerizable compound using an organoborane initiator, said method comprising the steps of:
   A. introducing the radical polymerizable compound and the organoborane initiator onto a substrate to form a mixture wherein the organoborane initiator is complexed with a bi-functional noncyclic blocking agent having a carbon backbone and two organoborane complexing moieties different from each other and selected from the group of an amine moiety, a thiol moiety, and a phosphine moiety and wherein the two differing moieties are separated from each other by two to four carbon atoms to increase nucleophilicity of the blocking agent towards the organoborane initiator thereby allowing the blocking agent to more completely interact with the organoborane initiator;
   B. decomplexing the organoborane initiator from the blocking agent thereby forming a radical; and
   C. polymerizing the radical polymerizable compound using the radical, at a temperature of from 20° C. to 30° C.

2. The method as set forth in claim 1, wherein
   the substrate is an automobile component,
   the mixture is a coating composition,
   the step of polymerizing cures the coating composition on the automobile component and the method optionally further comprises the step of electrocoating the automobile component with a first composition wherein the coating composition is applied to the first composition on the automobile component.

3. The method as set forth in claim 1, wherein the two differing moieties are separated from each other by two carbon atoms.

4. The method as set forth in claim 1, wherein the blocking agent is aliphatic and has a single terminal amine moiety and a single terminal thiol moiety.

5. The method as set forth in claim 1, wherein the blocking agent is free of carbon-carbon unsaturation and wherein the blocking agent is 2-aminoethanethiol.

6. The method as set forth in claim 1, wherein the step of decomplexing the organoborane initiator from the blocking agent is by introducing a decomplexing agent to the mixture that is reactive with at least one of the amine moiety, the thiol moiety, and the phosphine moiety to decomplex the organoborane initiator from the blocking agent and wherein the decomplexing agent is selected from the group of carbon dioxide, sulfur dioxide, and combinations thereof.

7. The method as set forth in claim 6, wherein the decomplexing agent is carbon dioxide.

8. The method as set forth in claim 6, wherein the step of introducing the radical polymerizable compound and the organoborane initiator onto the substrate to form the mixture and the step of introducing the decomplexing agent occur simultaneously.

9. The method as set forth in claim 6, wherein the step of introducing the radical polymerizable compound and the organoborane initiator onto the substrate to form the mixture and the step of introducing the decomplexing agent occur sequentially.

10. The method as set forth in claim 6, wherein the steps of introducing the radical polymerizable compound and the organoborane initiator onto the substrate and the step of introducing the decomplexing agent are each further defined as spraying from one or more spray guns.

11. The method as set forth in claim 1, wherein the radical polymerizable compound and the organoborane initiator are introduced simultaneously.

12. The method as set forth in claim 1, wherein the radical polymerizable compound and the organoborane initiator are introduced sequentially.

13. The method as set forth in claim 1, wherein the radical polymerizable compound is selected from the group consisting of unsaturated acrylic ester resins, acrylic ester monomers, methacrylates, and combinations thereof.

14. The method as set forth in claim 1, wherein the blocking agent is free of carbon-carbon unsaturation and wherein the blocking agent is 2-aminoethanethiol and the organoborane is complexed with the amine moiety or the thiol moiety of the 2-aminoethanethiol.

15. The method as set forth in claim 1, wherein the polymerizing is in the absence of external heating.

16. A radical polymerizable automotive coating composition comprising:
   A. a radical polymerizable compound; and
   B. an organoborane initiator complexed with a bi-functional noncyclic blocking agent having a carbon backbone and two organoborane complexing moieties different from each other and selected from said group of an amine moiety, a thiol moiety, and a phosphine moiety and wherein said two differing moieties are separated from each other by two to four carbon atoms to increase nucleophilicity of said blocking agent towards said organoborane initiator thereby allowing the blocking agent to more completely interact with the organoborane initiator.

17. The coating composition as set forth in claim 16, wherein said two differing moieties are separated from each other by two carbon atoms.

18. The coating composition as set forth in claim 16, wherein said blocking agent is aliphatic and has a single terminal amine moiety and a single terminal thiol moiety.

19. The coating composition as set forth in claim 16, wherein said blocking agent is free of carbon-carbon unsaturation and wherein said blocking agent is 2-aminoethanethiol.

20. The coating composition as set forth in claim 16, further comprising a decomplexing agent that is selected from said group of carbon dioxide, sulfur dioxide, and combinations thereof.

21. The coating composition as set forth in claim 20, further comprising a decomplexing agent that is carbon dioxide.

22. The coating composition as set forth in claim 16, wherein the blocking agent is free of carbon-carbon unsaturation and wherein the blocking agent is 2-aminoethanethiol and the organoborane is complexed with the amine moiety or the thiol moiety of the 2-aminoethanethiol.

* * * * *

UNITED STATES PATENT AND TRADEMARK OFFICE
CERTIFICATE OF CORRECTION

PATENT NO.        : 8,652,578 B2                           Page 1 of 1
APPLICATION NO.   : 13/380281
DATED             : February 18, 2014
INVENTOR(S)       : Cranfill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this

Twenty-ninth Day of September, 2015

Michelle K. Lee
*Director of the United States Patent and Trademark Office*